(12) United States Patent
Takeuchi (10) Patent No.: US 9,042,747 B2
(45) Date of Patent: May 26, 2015

(54) IMAGE FORMING APPARATUS THAT PERFORMS EFFECTIVE TONER REFRESH PROCESS, NON-TRANSITORY COMPUTER-READABLE RECORDING MEDIUM, AND IMAGE FORMING METHOD

(71) Applicant: KYOCERA Document Solutions Inc., Osaka (JP)

(72) Inventor: Naoki Takeuchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/190,108

(22) Filed: Feb. 26, 2014

(65) Prior Publication Data

US 2014/0241739 A1 Aug. 28, 2014

(30) Foreign Application Priority Data

Feb. 26, 2013 (JP) ................................ 2013-036329

(51) Int. Cl.
*G03G 15/00* (2006.01)
*G03G 15/08* (2006.01)
*G06K 15/00* (2006.01)

(52) U.S. Cl.
CPC .......... *G03G 15/556* (2013.01); *G03G 15/0844* (2013.01); *G06K 15/40* (2013.01)

(58) Field of Classification Search
CPC .. G03G 15/556; G03G 15/0844; G03G 21/10
USPC ............................................. 399/27, 29, 257
See application file for complete search history.

(56) References Cited

U.S. PATENT DOCUMENTS

| | | | |
|---|---|---|---|
| 7,493,057 B2 * | 2/2009 | Facci et al. ...................... | 399/27 |
| 2004/0213593 A1 * | 10/2004 | Brewington et al. ........... | 399/27 |
| 2005/0286917 A1 * | 12/2005 | Martin et al. .................... | 399/27 |
| 2009/0097869 A1 * | 4/2009 | Kono et al. ...................... | 399/27 |
| 2011/0052219 A1 * | 3/2011 | Ariizumi ......................... | 399/27 |

FOREIGN PATENT DOCUMENTS

| | | | |
|---|---|---|---|
| JP | 2001-075438 A | | 3/2001 |
| JP | 2002328496 A | * | 11/2002 |
| JP | 2009037192 A | * | 2/2009 |
| JP | 2009186568 A | * | 8/2009 |
| JP | 2012137659 A | * | 7/2012 |
| JP | 2012177721 A | * | 9/2012 |

* cited by examiner

*Primary Examiner* — Robert Beatty
(74) *Attorney, Agent, or Firm* — James W. Judge (57) ABSTRACT

An image forming apparatus includes an image carrier, a toner carrier, a region setting unit, a printing-rate detecting unit, a discharge-region determining unit, and a region redividing unit. The region setting unit is configured to set a plurality of regions divided along an image width direction on the image carrier. The printing-rate detecting unit is configured to detect a printing rate when forming the image for each of the plurality of regions. The discharge-region determining unit is configured to determine necessity of a toner discharge for each region based on the detected printing rate. The region redividing unit is configured to redivide a region determined to require the toner discharge into a plurality of regions in which respective printing rates during subsequent image formation are individually detected.

18 Claims, 7 Drawing Sheets

CONDITIONS
· TOTAL DOT NUMBER IN A4 SIZE = ABOUT 48 MILLION
· REGION EQUALLY DIVIDED INTO FIVE REGIONS IS MANAGED AS REFRESH CHECK REGIONS
· CHECK AVAILABILITY OF PERFORMING REFRESH FOR EVERY PRINTING OF 20 SHEETS
· REFRESH PROCESS IS PERFORMED WHEN PRINTING RATE IS 5% OR LESS

FIG. 5A

AVERAGE PRINTING RATE DURING PRINTING OF 20 SHEETS: 10.0%

| REGION | PRINT DOT NUMBER (TEN THOUSAND TIMES) | REGION WIDTH | FULL DOT NUMBER (TEN THOUSAND TIMES) | PRINTING RATE | REFRESH TARGET | COLLECTING TARGET |
|---|---|---|---|---|---|---|
| R11 | 48 | 1 | 960 | 5.0% | YES | NO |
| R12 | 72 | 1 | 960 | 7.5% | NO | NO |
| R13 | 120 | 1 | 960 | 12.5% | NO | YES |
| R14 | 144 | 1 | 960 | 15.0% | NO | YES |
| R15 | 96 | 1 | 960 | 10.5% | NO | YES |
| TOTAL | 480 | | 4800 | 10% | | |

(RELATIVELY LOW PRINTING RATE)

FIG. 5B

AVERAGE PRINTING RATE DURING PRINTING OF 20 SHEETS 10.0%

| REGION | PRINT DOT NUMBER (TEN THOUSAND TIMES) | REGION WIDTH | FULL DOT NUMBER (TEN THOUSAND TIMES) | PRINTING RATE | REFRESH TARGET | COLLECTING TARGET |
|---|---|---|---|---|---|---|
| R11-1 | 40 | 0.5 | 480 | 8.0% | NO | NO |
| R11-2 | 8 | 0.5 | 480 | 1.7% | YES | NO |
| R12 | 72 | 1 | 960 | 7.5% | NO | NO |
| R16 | 264 | 2 | 1920 | 13.8% | NO | YES |
| R15 | 96 | 1 | 960 | 10.0% | NO | YES |
| TOTAL | 480 | | 4800 | 10% | | |

(RELATIVELY LOW PRINTING RATE)

IMAGE FORMING APPARATUS THAT PERFORMS EFFECTIVE TONER REFRESH PROCESS, NON-TRANSITORY COMPUTER-READABLE RECORDING MEDIUM, AND IMAGE FORMING METHOD

CROSS-REFERENCE TO RELATED APPLICATION

This application is based upon, and claims the benefit of priority from, corresponding Japanese Patent Application No. 2013-036329 filed in the Japan Patent Office on Feb. 26, 2013, the entire contents of which are incorporated herein by reference.

BACKGROUND

Unless otherwise indicated herein, the description in this section is not prior art to the claims in this application and is not admitted to be prior art by inclusion in this section.

In an image forming apparatus such as a printer, toner inside of a developing device is carried by a developing roller (a toner carrier) to be supplied to a photoreceptor drum (an image carrier) so as to perform development.

In this image forming apparatus, if a printing rate on an image to be formed is low, a small amount of toner is used for development. This reduces turnover of toner within the developing device. If this situation repeats, the toner within the developing device is excessively charged. This may cause reduction in image density or fogging, thus reducing the image quality.

In response to this situation, although the toner itself has been improved, reduction in image quality has not been reliably reduced at present.

On the other hand, a technique that forcibly discharges toner within a developing device for refresh has been proposed.

SUMMARY

An image forming apparatus according to an embodiment of the disclosure includes an image carrier, a toner carrier, a region setting unit, a printing-rate detecting unit, a discharge-region determining unit, and a region redividing unit. The toner carrier is configured to carry toner and supply the toner to the image carrier so as to form a toner image. The region setting unit is configured to set a plurality of regions divided along an image width direction on the image carrier. The printing-rate detecting unit is configured to detect a printing rate for each of the plurality of regions. The discharge-region determining unit is configured to determine necessity of a toner discharge for each region based on the detected printing rate. The region redividing unit is configured to redivide a region determined to require the toner discharge into a plurality of regions in which respective printing rates during subsequent image formation are individually detected. The toner discharge is a refresh process that discharges toner from the toner carrier side to the image carrier side while not forming an image.

A non-transitory computer-readable recording medium storing a program for a refresh process for an image forming apparatus according to an embodiment of the disclosure includes an image carrier, a toner carrier, a region setting unit, a printing-rate detecting unit, a discharge-region determining unit, and a region redividing unit. The toner carrier is configured to carry toner and supply the toner to the image carrier so as to form a toner image. The region setting unit is configured to set a plurality of regions divided along an image width direction on the image carrier. The printing-rate detecting unit is configured to detect a printing rate for each of the plurality of regions. The discharge-region determining unit is configured to determine necessity of a toner discharge for each region based on the detected printing rate. The region redividing unit is configured to redivide a region determined to require the toner discharge into a plurality of regions in which respective printing rates during subsequent image formation are individually detected. The toner discharge is a refresh process that discharges toner from the toner carrier side to the image carrier side while not forming an image.

An image forming method according to an embodiment of the disclosure includes an image carrier and a toner carrier. The method comprising setting a plurality of regions divided along an image width direction on the image carrier, detecting a printing rate for each of the plurality of regions, determining necessity of a toner discharge for each region based on the detected printing rate, and redividing a region determined to require the toner discharge into a plurality of regions in which respective printing rates during subsequent image formation are individually detected. The toner discharge is a refresh process that discharges toner from the toner carrier side to the image carrier side while not forming an image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

In the accompanying drawings:

FIGS. 5A to 5C are examples of redivision and combination of regions in the first embodiment.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the disclosure, as generally described herein, and illustrated in the drawings, can be arranged, substituted, combined, separated, and designed in a wide variety of different configurations, all of which are explicitly contemplated herein.

The disclosure can reduce surplus refresh even in the case where the amount of toner consumption is uneven along the image width direction. This is achieved by determining necessity of toner discharge based on a printing rate for each of a plurality of regions on an image carrier and by redividing a region requiring toner discharge into a plurality of regions.

First Embodiment

Schematic Configuration of Image Forming Apparatus

Figure 1:
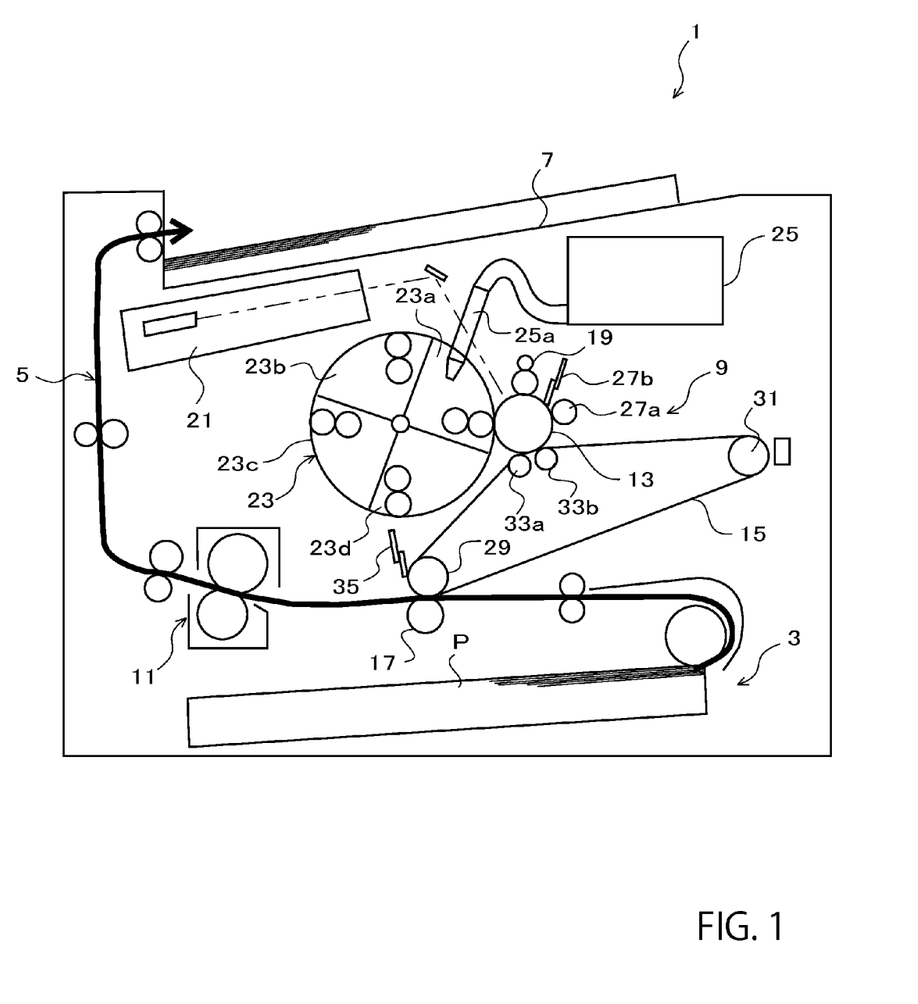
FIG. 1 shows a schematic configuration diagram of an image forming apparatus according to a first embodiment.

FIG. 1 shows a schematic configuration diagram of an image forming apparatus according to a first embodiment of the disclosure.

For example, the image forming apparatus 1 of this embodiment includes a printer, a digital multi-functional peripheral, or similar printer. The image forming apparatus 1 performs at least printing (image formation) and performs refresh by discharging the toner during non-printing time (when an image is not formed). The refresh will be described later together with a configuration of a control unit 57 in FIG. 3.

During printing time, as illustrated in FIG. 1, a paper sheet P from a sheet feeding mechanism 3 is conveyed to a discharge tray 7 by a paper sheet conveyance passage 5. During this conveyance, a toner image is transferred and fixed on the paper sheet P by a transfer unit 9 and a fixing unit 11.

The transfer unit 9 includes a photoreceptor drum 13 as an image carrier, an intermediate transfer belt 15, and a transfer roller 17.

In the photoreceptor drum 13, for example, a photosensitive layer such as an amorphous silicon photoreceptor and an organic photoreceptor (an OPC photoreceptor) is laminated on a rotatable aluminum drum. The photoreceptor drum 13 is charged on its surface by a charging unit 19 and is irradiated with a laser beam from an exposure unit 21, so as to form an electrostatic latent image. Here, the irradiation of the laser beam is performed based on original image data input from, for example, a personal computer. Toner is supplied to this photoreceptor drum 13 from a developing unit 23 so as to form (develop) a toner image.

The developing unit 23 is cartridge type where a developing device and a toner container are integrated. In this embodiment, the developing unit 23 includes developing devices 23a, 23b, 23c, and 23d corresponding to respective colors of yellow, magenta, cyan, and black. Toner replenishment (toner install) to the developing devices 23a to 23d is performed from a toner cartridge 25 through a replenishment pipe 25a.

The developing devices 23a to 23d sequentially rotate and move to a position facing the photoreceptor drum 13, and attach the toner to the electrostatic latent image on the photoreceptor drum 13 so as to form the toner image. The formed toner image is transferred from the photoreceptor drum 13 to the intermediate transfer belt 15 (a primary transfer). After the transfer of the toner image, toner remaining on the surface of the photoreceptor drum 13 is removed by a cleaning roller 27a and a cleaning blade 27b.

The intermediate transfer belt 15 is formed of a sheet made of dielectric resin and wound around a drive roller 29 and a driven roller 31. This intermediate transfer belt 15 is brought into contact with the photoreceptor drum 13 by intermediate transfer rollers 33a and 33b.

With application of a negative transfer bias (for a positively charged toner is used), the intermediate transfer rollers 33a and 33b transfer the toner image from the photoreceptor drum 13 onto the intermediate transfer belt 15. Performing this operation for each color transfers a full-color toner image to the intermediate transfer belt 15. The full-color toner image is transferred to the paper sheet P between the intermediate transfer belt 15 and the transfer roller 17 (a secondary transfer).

While a negative transfer bias is applied to the transfer roller 17, the paper sheet P is sandwiched between the intermediate transfer belt 15 and the transfer roller 17. This allows transferring a toner image from the intermediate transfer belt 15 onto the paper sheet P. At downstream of the transfer roller 17, a belt cleaning blade 35 is located to remove the toner remaining on the surface of the intermediate transfer belt 15.

Figure 2:
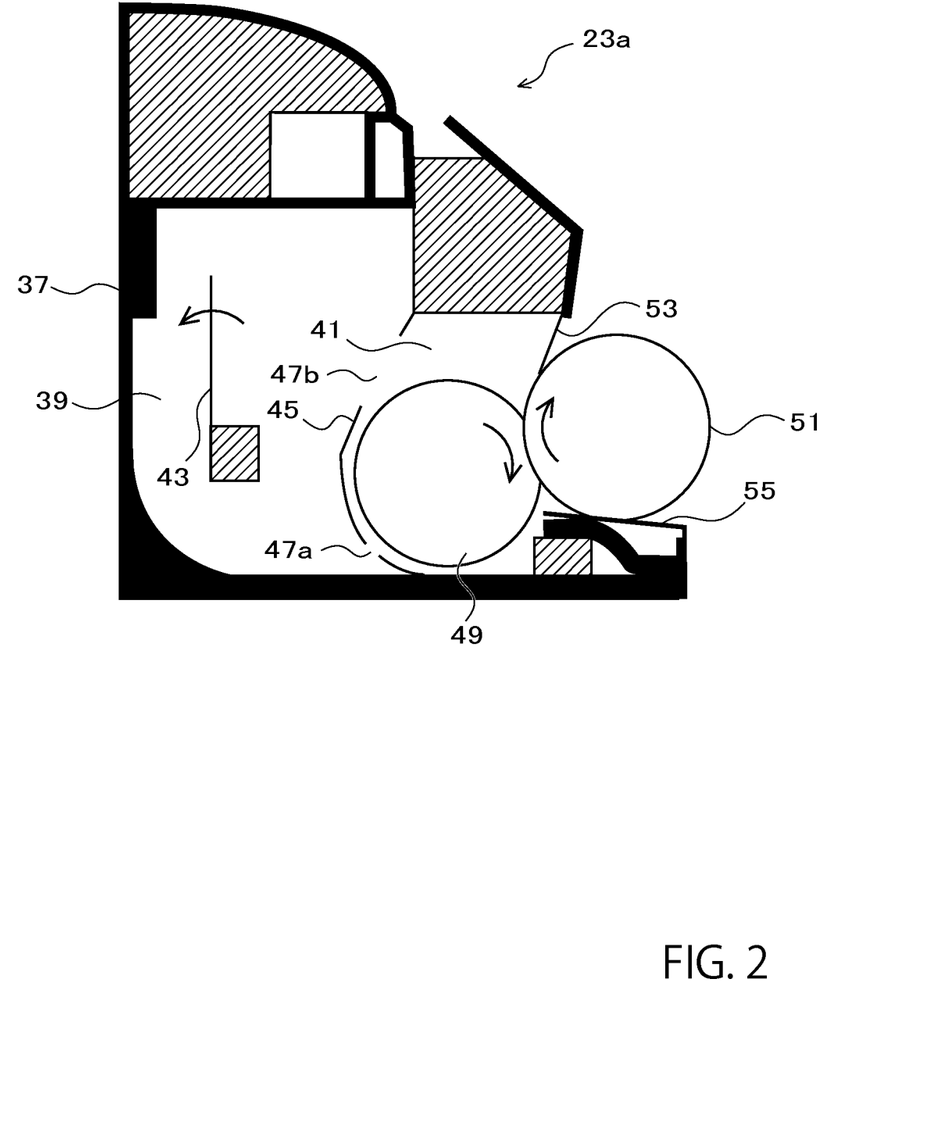
FIG. 2 shows a schematic cross-sectional view of a developing device of the image forming apparatus in FIG. 1.

FIG. 2 shows a cross-sectional view of the developing device of the image forming apparatus in FIG. 1. In the following description, a description will be given of the configuration and the operation of the developing device 23a in FIG. 1. The configurations and the operations of the developing devices 23b to 23d are basically similar to the configuration and the operation of the developing device 23a, and therefore it will not be further elaborated here.

As illustrated in FIG. 2, the developing device 23a includes a toner stirring unit 39 and a toner supplying unit 41 within a developing container 37 made of resin. The toner stirring unit 39 houses toner and supplies the toner to the toner supplying unit 41 using a stir paddle 43 that rotates.

The toner supplying unit 41 is separated from the toner stirring unit 39 by a separation wall 45. On the separation wall 45, opening portions 47a and 47b are formed. From one opening portion 47a, the toner can be supplied to the toner supplying unit 41. The other opening portion 47b returns surplus toner within the toner supplying unit 41 to the toner stirring unit 39.

Within this toner supplying unit 41, a supply roller 49 and a developing roller 51 are located. The supply roller 49 is located corresponding to one opening portion 47a, and rotates to supply the toner to the developing roller 51.

The developing roller 51 is a toner carrier that carries toner, and supplies the toner to the opposing photoreceptor drum 13 side by rotation (see FIG. 1). Between this developing roller 51 and the developing container 37, a regulating member 53 and a sealing member 55 are located.

The regulating member 53 regulates the layer thickness of the toner on the developing roller 51 and triboelectrically charges the toner so as to allow development on the photoreceptor drum 13. The sealing member 55 seals a portion between the developing roller 51 and the developing container 37 so as to prevent toner leakage.

In this developing device 23a, the toner inside of the toner stirring unit 39 passes through the opening portion 47a by rotation of the stir paddle 43 so as to be transferred to the toner supplying unit 41. The toner transferred to the toner supplying unit 41 side is transported to the developing roller 51 by the supply roller 49, is regulated to be a thin layer by the regulating member 53, and then develops the electrostatic latent image on the photoreceptor drum 13.

After the development, the toner remaining on the developing roller 51 is peeled by the supply roller 49 after passing through the sealing member 55 and returned into the toner supplying unit 41. The returned toner and additionally supplied toner are housed within the toner supplying unit 41.

However, surplus toner is returned from the opening portion 47b of the separation wall 45 to the toner stirring unit 39.

Configuration of Control Unit

Figure 3:
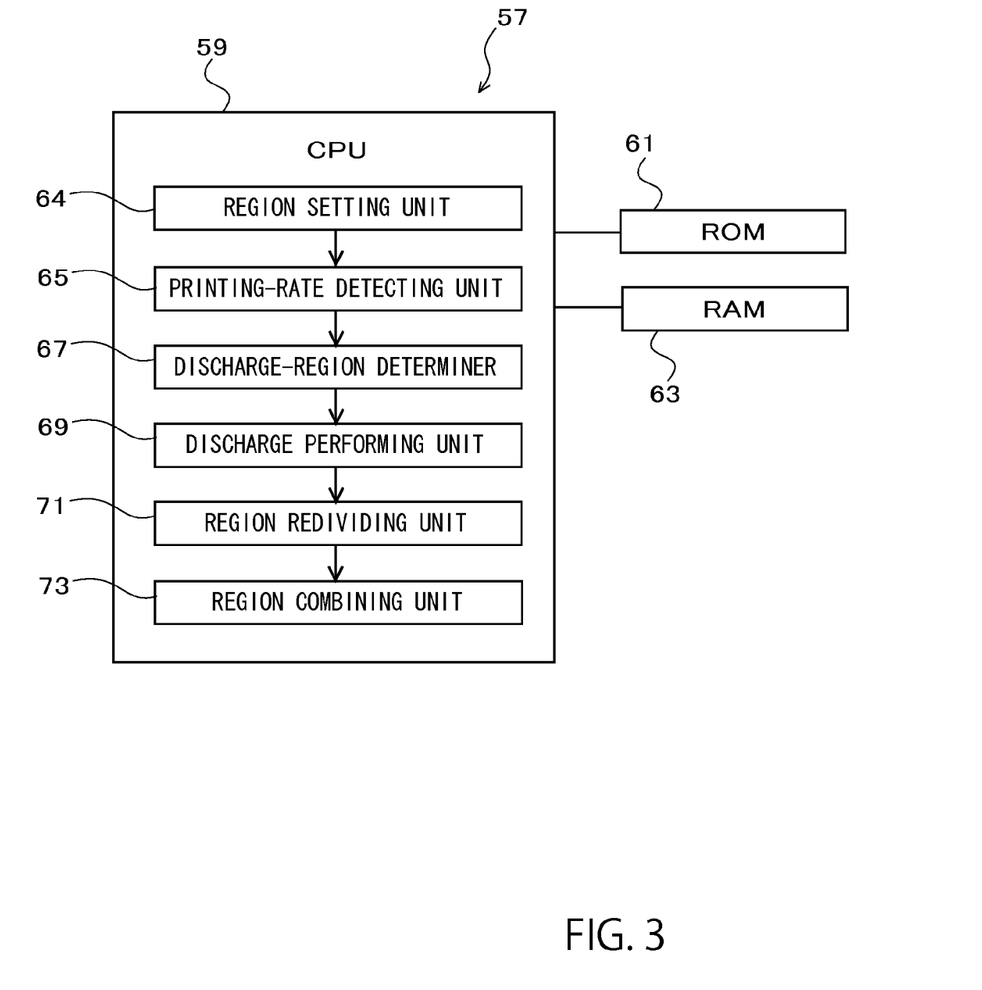
FIG. 3 shows a block diagram illustrating a control unit used in the image forming apparatus in FIG. 1.

FIG. 3 shows a block diagram illustrating a control unit of the image forming apparatus in FIG. 1. The image forming apparatus 1 of this embodiment is controlled by the control unit 57 so as to perform refresh process during non-printing time in addition to the above-described printing operation.

The control unit 57 includes a central processing unit (CPU) 59, a read only memory (ROM) 61, a random access memory (RAM) 63, and similar member.

The CPU 59 is a processing unit that executes a predetermined process by execution of a program. The ROM 61 is a non-volatile memory (a storage device) that stores a program and similar data. The RAM 63 is a memory (a storage device) that temporarily stores, during execution of the program, this program and various data as a work area.

In this embodiment, the CPU 59 executes a refresh program within the ROM 61 so as to function as a region setting unit 64, a printing-rate detecting unit 65, a discharge-region determiner (determining unit) 67, a discharge performing unit 69, a region redividing unit 71, and a region combining unit 73. Control of the printing operation can be achieved by a well-known program and functions of this program, and therefore the description will not be further elaborated here.

Figure 4:
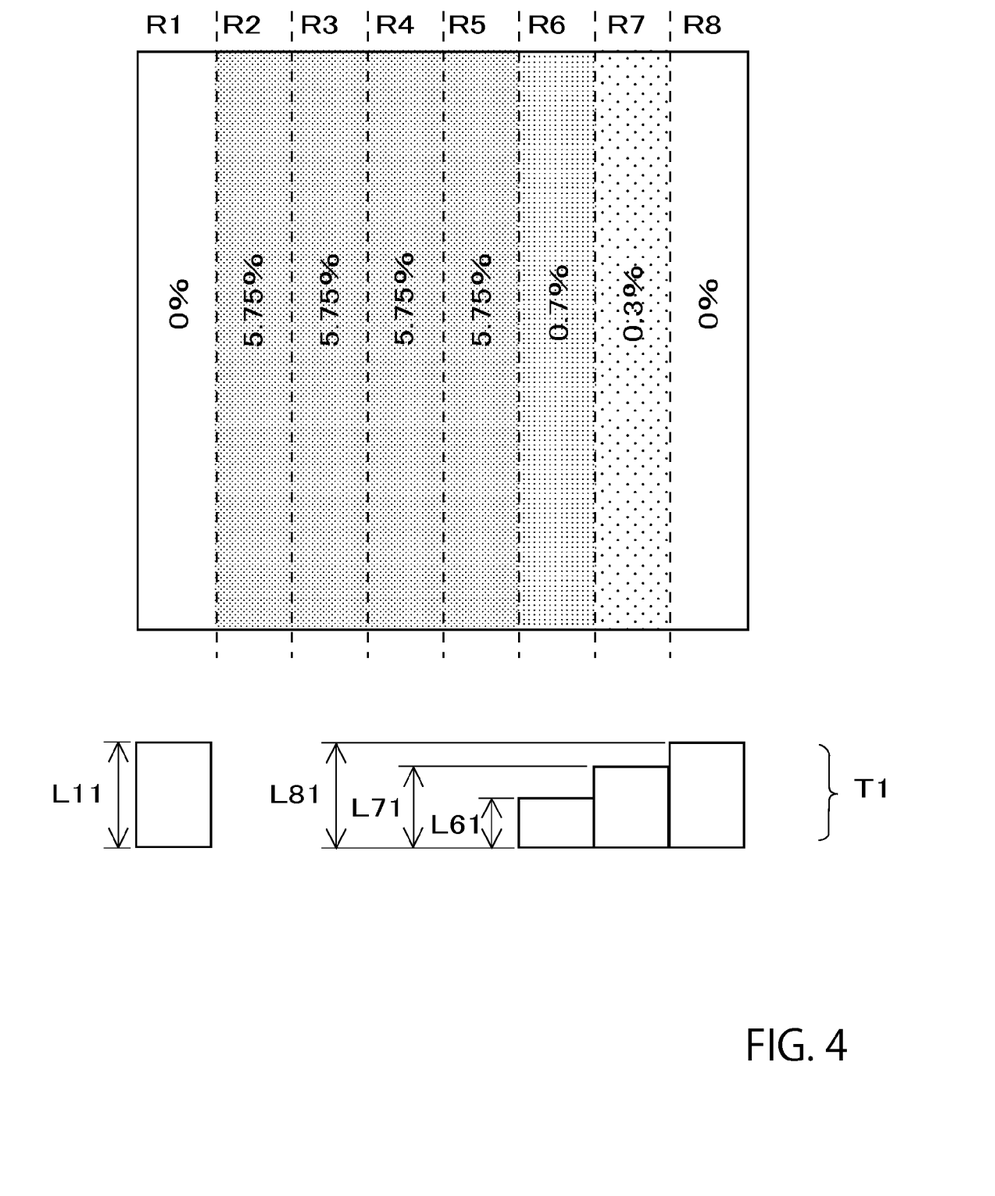
FIG. 4 shows a conceptual diagram illustrating an exemplary printing rate for each region in the first embodiment.

The region setting unit 64 realizes a region setting function, and sets a plurality of regions to be divided along a width direction (an image width direction) of the developing region on the photoreceptor drum 13. FIG. 4 illustrates exemplary division regions. In FIG. 4, eight regions R1 to R8 are set and are equally divided along the image width direction. The division number of the regions can be any number and can be changed from an operation panel or similar member of the image forming apparatus 1.

The printing-rate detecting unit 65 realizes a printing-rate detecting function, and detects a printing rate during printing for each of the plurality of regions on the photoreceptor drum 13. The detection of the printing rate for each region is performed by sequentially detecting the printing rate during immediately previous printing and performing aggregate calculation until the refresh process is performed.

The printing rate is a proportion of an area for printing to an area (a paper sheet size) that allows image formation. The printing means image formation. The printing is not limited to characters, but includes photographs and graphic images.

In the example of FIG. 4, the regions R1 and R8 have a printing rate of 0%, the regions R2 to R5 have a printing rate of 5.75%, the region R6 has a printing rate of 0.7%, and the region R7 has a printing rate of 0.3%.

The discharge-region determiner 67 realizes a discharge-region determining function, and determines necessity of toner discharge based on a detected printing rate for each region.

Specifically, the printing rate detected by the printing-rate detecting unit 65 for each region is compared with a reference printing rate (a threshold value for refresh process). Subsequently, a region with a printing rate equal to or less than the reference printing rate is determined as a region requiring the toner discharge. For example, in case of FIG. 4, when the reference printing rate is set as C1=1.5%, the regions R1 and R6 to R8 become regions requiring the toner discharge.

The timing to determine the necessity of the toner discharge (the timing of the refresh process) is not specifically limited. For example, possible timing includes a time when the number of printed sheets exceeds a predetermined number, a time when toner usage exceeds a predetermined amount, or a time when difference between the highest printing rate and the lowest printing rate among the regions becomes equal to or more than a predetermined value.

The discharge-region determiner 67 determines the necessity of the toner discharge and determines the discharge amount. The discharge amount is, for example, determined as the printing length by toner discharge. In this case, this determination can be made such that the shortage of the printing rate with respect to the reference printing rate C1 is multiplied by the length of the developing region (the circumferential length) on the photoreceptor drum 13.

That is, assume that the printing length is Ln for the n-th region Rn, the printing rate is bn, and the circumferential length is L0. In this case, calculation is performed by $Ln = L0 \times (C1 - bn)/100$.

In case of FIG. 4, when the reference printing rate C1 is set to 1.5% and the circumferential length is set to 297 mm (A4 size), respective printing lengths L11 and L81 become about 4.46 mm in the regions R1 and R8, a printing length L16 becomes about 2.38 mm in the region R6, and a printing length L71 becomes about 3.56 mm in the region R7. The overall toner discharge pattern T1 in FIG. 4 is set with all these parameters.

The discharge performing unit 69 realizes a discharge execution procedure, and performs toner discharge as a refresh process for a region requiring the toner discharge ("toner discharge" is referred to as "refresh process" in some cases). In this embodiment, the photoreceptor drum 13, the charging unit 19, the exposure unit 21, the developing unit 23, and similar member in FIG. 1 are controlled to discharge a toner discharge pattern on the photoreceptor drum 13.

After refresh process by this toner discharge, the region redividing unit 71 and the region combining unit 73 redivide and combine the regions in this embodiment.

Figure 5A:
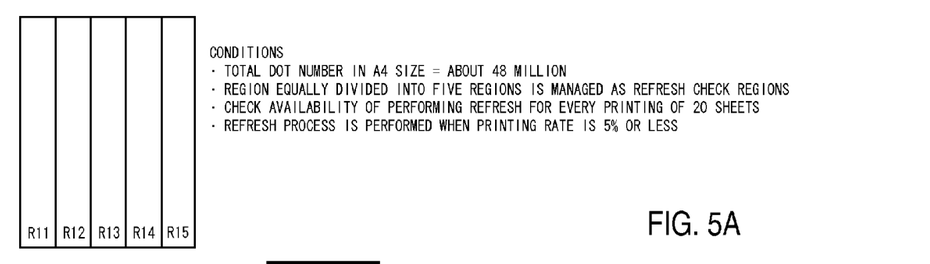
FIG. 5A shows a conceptual diagram of division regions before redivision and combination.
Figure 5B:
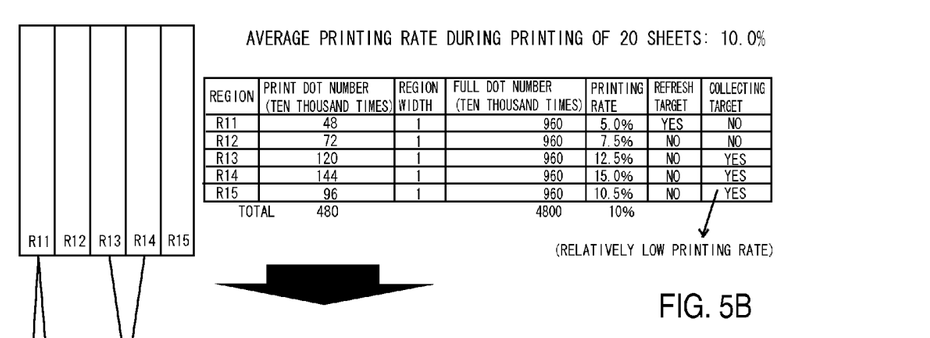
FIG. 5B shows a conceptual diagram illustrating the division regions in FIG. 5A together with printing rates and similar parameter of these division regions.
Figure 5C:
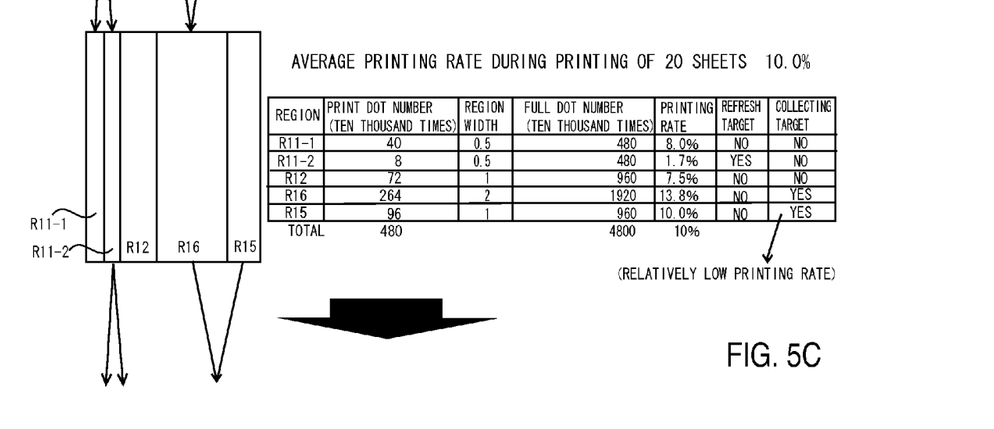
FIG. 5C shows a conceptual diagram illustrating the division regions after redivision and combination together with the printing rates and similar parameter of these division regions.

FIGS. 5A to 5C are examples of redivision and combination of the regions. FIG. 5A shows a conceptual diagram of division regions before redivision and combination. FIG. 5B shows a conceptual diagram illustrating the division regions in FIG. 5A together with printing rates and similar parameter of these division regions. FIG. 5C shows a conceptual diagram illustrating the division regions after redivision and combination together with the printing rates and similar parameter of these division regions.

In the examples of FIGS. 5A to 5C, as illustrated in FIG. 5A, in the case where the total dot number is about 48 million (A4 size), the entire region is equally divided into five regions R11 to R15 along the image width direction as default setting so as to be managed as refresh check regions. Here, the refresh check region is a region where a printing rate for refresh is detected.

In this example, the refresh process is performed for every printing of 20 sheets. At that time, a region with a printing rate of 5% (a threshold value for refresh process) or less is determined as a region requiring toner discharge by the discharge-region determiner 67.

Specifically, the refresh process is performed in a time between FIG. 5B and FIG. 5C and at a time after FIG. 5C. The region R11 is determined as a region requiring toner discharge in FIG. 5B and a region R11-2 is determined as a region requiring toner discharge in FIG. 5C ("refresh targets" in FIG. 5B and FIG. 5C).

The region redividing unit 71 redivides the region requiring the toner discharge during this refresh process into a plurality of regions. The region is redivided after the refresh process is performed on the target region (the region requiring toner discharge). Therefore, the region redividing unit 71 of this embodiment redivides the region where the toner discharge is performed by the discharge performing unit 69.

In the examples of FIGS. 5A to 5C, the region R11 with the printing rate of 5% or less in FIG. 5B is redivided into the region R11-1 and R11-2 as illustrated in FIG. 5C. While the redivision of the region is division into two regions along the image width direction, the redivision may be division into three or more regions corresponding to a printing rate, a region width, and similar parameter of the region before the division.

Respective printing rates of the redivided regions are individually detected by the printing-rate detecting unit 65 for the subsequent refresh process. In the examples of FIGS. 5A to 5C, as illustrated in FIG. 5C, the respective printing rates of the divided regions R11-1 and R11-2 are detected together with the printing rates of the other regions. The region R11-2 with the printing rate of 5% or less is redivided after the subsequent refresh as a region requiring toner discharge.

Redivision of the region can be performed separately from the refresh process. For example, the discharge-region determiner 67 may determine a region requiring toner discharge in a shorter cycle than that of refresh process and the region redividing unit 71 may sequentially redivide the determined region for every cycle.

The region combining unit 73 realizes a region combining function, and combines a plurality of regions not requiring toner discharge (not requiring refresh process) in the case where these regions are adjacent to one another.

In this embodiment, the discharge-region determiner 67 set a region with a printing rate exceeding a threshold value for combination among the regions not requiring toner discharge as a combining target. However, all the regions not requiring toner discharge may be set as combining targets. The threshold value for combination can be set to any value, and is set to an average printing rate for all the regions in this embodiment. In the case where a plurality of regions of the combining targets are adjacent to one another, the region combining unit 73 combines these regions into one region.

In the examples of FIGS. 5A to 5C, as illustrated in FIG. 5B, since the average printing rate (the threshold value for combination) for all the regions is 10%, adjacent regions R13 and R14 with respective printing rates of 10% or more are set to combining targets ("collecting targets" in FIG. 5B). As illustrated in FIG. 5C, these regions R13 and R14 are combined into a region R16.

While the region R15 adjacent to the region R14 also has a printing rate of 10% or more, the two regions R13 and R14 with relatively high printing rates are preferentially combined and the region R15 with a relatively low printing rate is excluded from the combination. However, all the regions R13 to R15 may be combined.

Regarding the combined region, similarly to the redivided regions, the printing rate for the subsequent refresh process is detected by the printing-rate detecting unit 65. In the examples of FIGS. 5A to 5C, the printing rate of the region R16 combined as illustrated in FIG. 5C is detected together with the other regions. The adjacent regions R16 and R15 with respective printing rates of 10% or more are combined after the subsequent refresh.

When the regions are combined, the refresh process is not performed on the target regions. The refresh process is preferred to be performed in the same time period of redivision of the region.

Refresh Process

Figure 6:
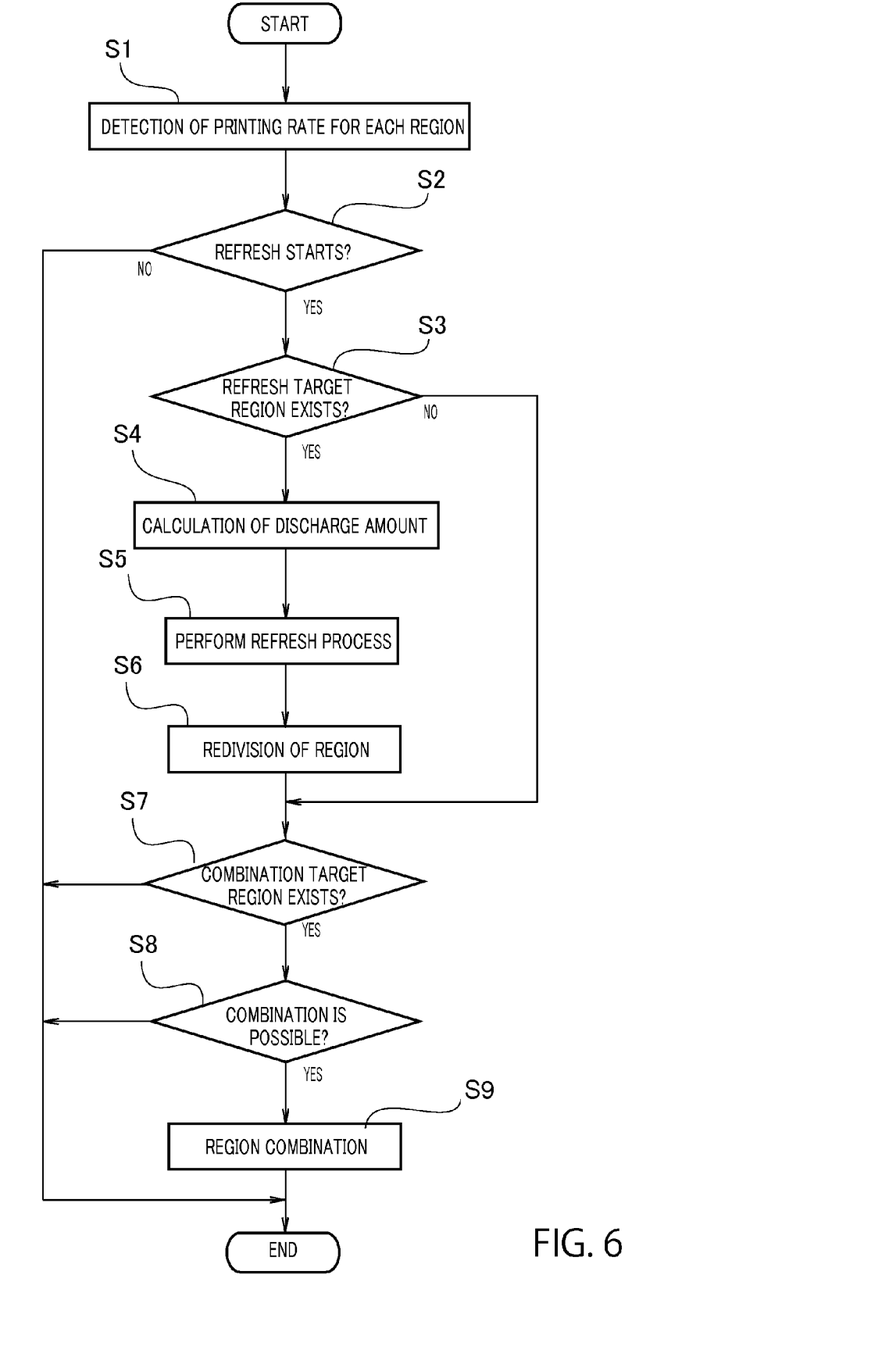
FIG. 6 shows a flowchart illustrating a refresh process by the control unit in FIG. 3 in the first embodiment.

The following describes a refresh process by the image forming apparatus 1 of this embodiment with reference to FIGS. 5A to 5C and FIG. 6. FIG. 6 shows a flowchart illustrating a refresh process by the control unit in FIG. 3. The refresh process is performed on one of the developing devices 23a to 23d of the developing unit 23, and is similarly performed on the other developing devices.

The refresh process of this embodiment is performed in a time between FIG. 5B and FIG. 5C in the examples of FIGS. 5A to 5C. The flowchart in FIG. 6 is started after termination of a print job.

Firstly, in step S1, "Detection of printing rate for each region" is performed. In this process, the printing-rate detecting unit 65 detects a printing rate by the immediately previous print job for each region. In this embodiment, as illustrated in FIG. 5B, each printing rate of the five regions R11 to R15 are detected.

When step S1 thus completes, the process proceeds to step S2.

In step S2, a process of "Refresh starts?" is performed. In this process, it is determined whether or not a start condition for refresh is satisfied. The start condition is satisfied in the case where the number of printed sheets becomes 20 in the examples of FIGS. 5A to 5C. This process can be performed by, for example, the discharge-region determiner 67. The discharge-region determiner 67 determines whether or not necessity of toner discharge is determined from the above-described start condition.

In the case where the refresh process is started, the process proceeds to step S3 (in case of YES). In the case where the refresh process is not started, the refresh process terminates (in case of NO).

In step S3, a process of "Refresh target region exists?" is performed. That is, the discharge-region determiner 67 determines whether or not a printing rate calculated for each region is equal to or less than a threshold value (the reference printing rate) for refresh process.

In the case where there is any region with a printing rate equal to or less than the threshold value for refresh process, this region is determined as a region requiring refresh process (toner discharge). Subsequently, the process proceeds to step S4 (in case of YES). On the other hand, in the case where there is no region with a printing rate equal to or less than the threshold value for refresh process, the process proceeds to step S7 (in case of NO).

In the examples of FIGS. 5A to 5C, as described above, the threshold value for refresh process is 5%. Accordingly, the region R11 in FIG. 5B becomes a region requiring refresh process and the process proceeds to step S4.

In step S4, a process of "Calculation of discharge amount" is performed. That is, the discharge-region determiner 67 calculates a printing length that is a toner discharge amount for the region requiring refresh process. In this embodiment, similarly to the description of FIG. 4, a toner discharge pattern is set to the region R11 of FIG. 5B.

When step S4 thus completes, the process proceeds to step S5.

In step S5, a process of "Perform refresh process" is performed. In this process, the discharge performing unit 69 discharges a toner discharge pattern on the photoreceptor drum 13 from the developing roller 51. The toner discharge may be set to protrude from the region R11 to the adjacent region R12 in FIG. 5B. In this case, this improves toner placement on the boundary between the region R11 and the adjacent region so as to reliably perform refresh process.

When step S5 thus completes, the process proceeds to step S6.

It is only necessary to remove the toner discharge pattern on the photoreceptor drum 13 by the cleaning roller 27a and the cleaning blade 27b or by the belt cleaning blade 35 after the primary transfer to the intermediate transfer belt 15 (see FIG. 1).

In step S6, a process of "Redivision of region" is performed. In this process, the region on which the refresh process is performed by the region redividing unit 71 is redivided into two regions along the image width direction. In the examples of FIGS. 5A to 5C, the region R11 in FIG. 5B is redivided into the two regions R11-1 and R11-2 as illustrated in FIG. 5C.

When step S6 thus completes, the process proceeds to step S7.

In step S7, a process of "Combination target region exists?" is performed. That is, the discharge-region determiner 67 determines whether or not the printing rate of the region determined not to require refresh process is equal to or more than the average printing rate as the threshold value for combination.

In the case where there is any region with a printing rate equal to or more than the average printing rate, the process proceeds to step S8 (in case of YES). In the case where that region does not exist, this refresh process terminates.

In the examples of FIGS. 5A to 5C, as illustrated in FIG. 5B, the regions R13 to R15 has respective printing rates of the average printing rate of 10% or more. Accordingly, these regions become combining targets and the process proceeds to step S8.

In step S8, a process of "Combination is possible?" is performed. In this process, the region combining unit 73 determines whether or not the plurality of the regions of the combining targets are adjacent to one another.

In the case where the plurality of the regions of the combining targets are adjacent to one another, the process proceeds to step S9. In the case where the plurality of the regions of the combining targets are not adjacent to one another, this refresh process terminates.

In the examples of FIGS. 5A to 5C, the plurality of the regions R13 to R15 as the combining targets are adjacent to one another. Therefore, the process proceeds to step S9.

In step S9, a process of "Region combination" is performed. In this process, the region combining unit 73 combines the adjacent regions of the combining targets. In the examples of FIGS. 5A to 5C, the two regions R13 and R14 with relatively high printing rates among the regions R13 to R15 are preferentially combined into one region R16. Accordingly, this refresh process terminates.

After this refresh process terminates, the flowchart of FIG. 6 is repeated for the subsequent refresh. Accordingly, in the examples of FIGS. 5A to 5C, as illustrated in FIG. 5C, the region R11-2 is redivided and the regions R16 and R15 are combined.

Advantageous Effects of the First Embodiment

The image forming apparatus 1 of this embodiment includes the developing roller 51 that carries toner and supplies the toner to the photoreceptor drum 13 when an image is formed so as to form a toner image. The image forming apparatus 1 performs refresh that discharges toner from the developing roller 51 side to the photoreceptor drum 13 side when an image is not formed. The image forming apparatus 1 includes the region setting unit 64, the printing-rate detecting unit 65, the discharge-region determiner 67, and the region redividing unit 71. The region setting unit 64 sets the plurality of the regions R11 to R15 divided along the image width direction on the photoreceptor drum 13. The printing-rate detecting unit 65 detects a printing rate when the image is formed for each of the plurality of the regions R11 to R15. The discharge-region determiner 67 determines necessity of toner discharge for each region based on the detected printing rate. The region redividing unit 71 redivides the region R11 determined to require the toner discharge into the plurality of the region R11-1 and R11-2 in which respective printing rates during the subsequent image formation are individually detected.

Accordingly, in this embodiment, the necessity of the toner discharge is determined based on the printing rate for each of the plurality of the regions R11 to R15 along the image width direction. This allows performing refresh for a necessary region only.

As a result, this embodiment ensures the uniform amount of toner consumption on the developing roller 51 along the image width direction even in the case where a printing rate is varied in the print area. This solve the problem of the surplus refresh process performed on a portion with a sufficient amount of toner consumption due to equally performed refresh process even in the case where an amount of toner consumption is uneven along an image width direction of a photoreceptor drum.

Additionally, the region R11 requiring refresh process (toner discharge) is redivided into the plurality of the regions R11-1 and R11-2 in which the subsequent printing rates are individually detected. This allows determining the necessity of toner discharge of the redivided regions in detail based on the printing rates.

This more reliably reduces surplus refresh and appropriately performs refresh on the necessary region.

For example, while a small amount of printing is performed in the end portion of the paper sheet, a pattern such as a frame line is positioned in a portion slightly inside of the end portion in some cases. In the case where the end portion and the pattern of the paper sheet exist in the same region, if redivision of the region is not performed, the refresh process might not be performed on a portion corresponding to the end portion of the paper sheet or unnecessary refresh process might be performed on a portion corresponding to the pattern.

In this embodiment, the redivision of the region reliably reduces these malfunctions.

Furthermore, in this embodiment, the redivision subdivides only a portion requiring more detailed refresh check. This improves the process speed compared with the case where all the regions are preliminarily subdivided.

The image forming apparatus 1 of this embodiment includes the discharge performing unit 69 that performs refresh process on the region R11 requiring refresh process. The region redividing unit 71 redivides the region R11 on which toner discharge has been performed.

Accordingly, this embodiment reliably redivides the region requiring refresh process in a refresh cycle.

The discharge-region determiner 67 determines a region with a detected printing rate lower than the threshold value for refresh process as a region requiring refresh process.

Accordingly, this embodiment more reliably redivides a region requiring refresh process.

The image forming apparatus 1 of this embodiment includes the region combining unit 73 that combines a plurality of regions not requiring refresh process in the case where these regions are adjacent to one another.

This embodiment reduces the refresh check regions. Although performing the redivision of the region increases the number of the refresh check regions, performing combination of the regions not requiring refresh process together with the redivision does not increase or reduces the number of the refresh check regions, thus avoiding complication of the process.

The discharge-region determiner 67 determines a target of the combination in the case where the printing rate detected at the region not requiring refresh process exceeds the threshold value for combination. The region combining unit 73 combines a plurality of regions that are targets of the combination in the case where these regions are adjacent to one another.

Accordingly, this embodiment reliably combines regions not requiring refresh process in a refresh cycle similar to that of redivision of the region.

Second Embodiment

Figure 7:
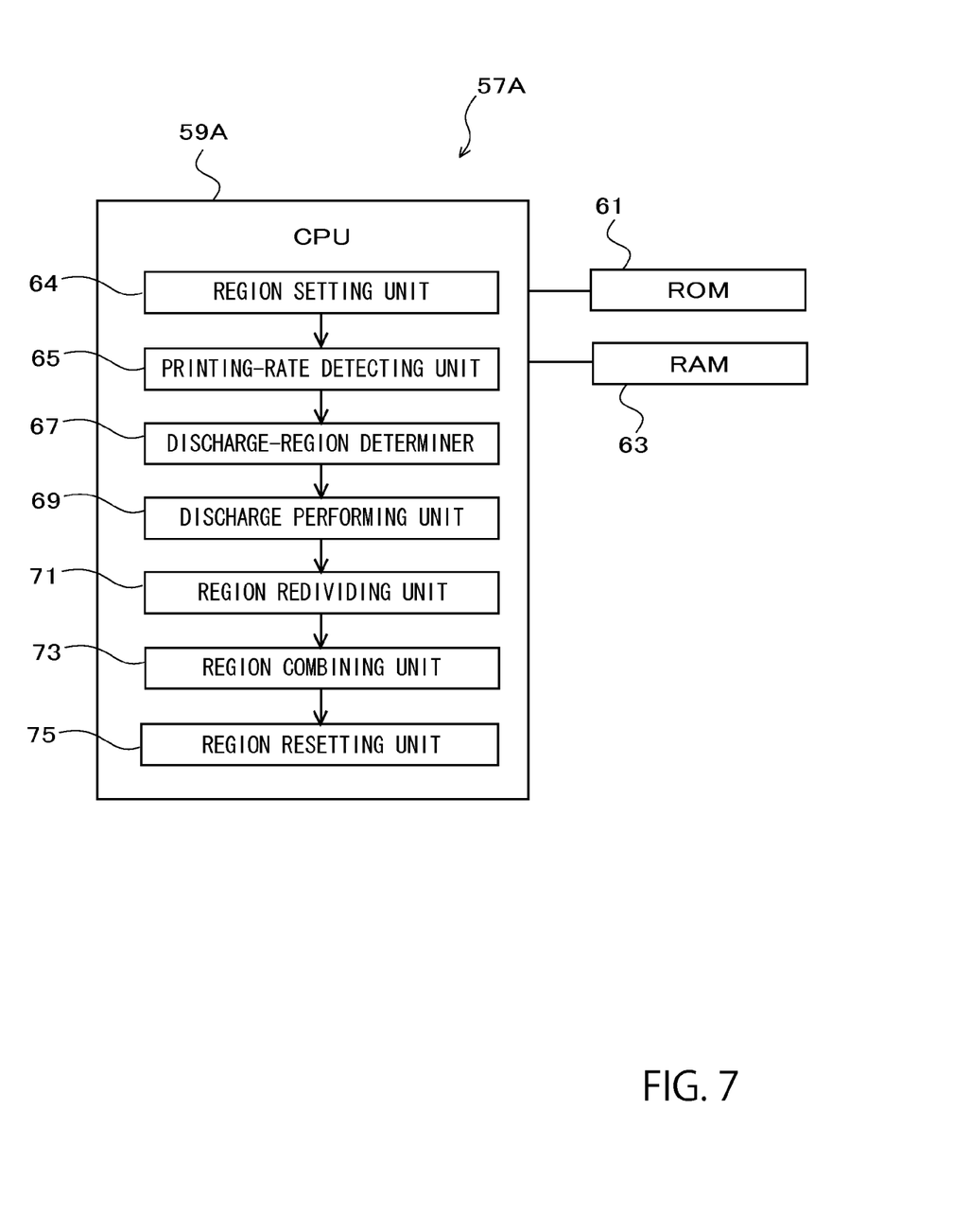
FIG. 7 shows a block diagram illustrating a control unit used in an image forming apparatus according to a second embodiment.

FIG. 7 shows a block diagram illustrating a control unit of an image forming apparatus. Here, this embodiment has a basic configuration in common with first embodiment. Therefore, like reference numerals or the same reference numerals with A are given to corresponding configurations, and the repeated description will be omitted correspondingly.

In this embodiment, a control unit 57A further includes a region resetting unit 75.

The region resetting unit 75 realizes a region resetting function, and resets redivision or combination of regions in the case where the tendency of the printing rate has changed after redivision or combination of the regions. In this embodiment, it is determined that the tendency of the printing rate has changed at a time when the change amount of the average printing rate for all the regions exceeds an allowable change width.

This allows dealing with the case where the overall tendency of the printing rate has changed, thus more reliably reducing surplus refresh and performing appropriate refresh on a necessary region. Here, the allowable change width can be set to any width.

The region resetting unit 75 determines the tendency of the printing rate has changed in the case where the change amount of at least any one of the regions changes to exceed the allowable change width in units of region even when the change amount of the average printing rate is within a range of the allowable change width.

This allows dealing with a local change of the printing rate, thus more reliably reducing surplus refresh and performing appropriate refresh on a necessary region. Here, the allowable change width in units of region can be set to any width.

The condition for reset can be set as necessary. For example, reset can be performed at a time when combination of the regions becomes impossible. With reference to the examples of FIGS. 5A to 5C, assume that the regions R16 and R15 in FIG. 5C are combined and then the region R12 is additionally combined with the combined region. In this case, the combined region becomes adjacent to the region R11-2 requiring refresh process. Accordingly, combination of the regions becomes impossible. It is only necessary to perform reset in this state.

This embodiment provides operations and effects similar to those of first embodiment in addition to the operation and effect of the reset described above.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   an image carrier;
   a toner carrier configured to carry toner and supply the toner to the image carrier so as to form a toner image;
   a region setting unit configured to set a plurality of regions divided along an image width direction on the image carrier;
   a printing-rate detecting unit configured to detect a printing rate for each of the plurality of regions;
   a discharge-region determining unit configured to determine necessity of a toner discharge for each region based on the detected printing rate; and
   a region redividing unit configured to redivide a region determined to require the toner discharge into a plurality of regions in which respective printing rates during subsequent image formation are individually detected; wherein
   the toner discharge is a refresh process that discharges toner from the toner carrier side to the image carrier side while not forming an image.

2. The image forming apparatus according to claim 1, further comprising a discharge performing unit configured to perform the toner discharge on the region determined to require the toner discharge; wherein
   the region redividing unit is configured to redivide a region on which the toner discharge has been performed.

3. The image forming apparatus according to claim 1, wherein the discharge-region determining unit is configured to determine a region with the detected printing rate lower than a threshold value for the refresh process as a region requiring the toner discharge.

4. The image forming apparatus according to claim 1, further comprising a region combining unit configured to combine a plurality of regions not requiring the toner discharge in a case where the plurality of regions are adjacent to one another.

5. The image forming apparatus according to claim 2, further comprising a region combining unit configured to combine a plurality of regions not requiring the toner discharge in a case where the plurality of regions are adjacent to one another.

6. The image forming apparatus according to claim 3, further comprising a region combining unit configured to combine a plurality of regions not requiring the toner discharge in a case where the plurality of regions are adjacent to one another.

7. The image forming apparatus according to claim 4, wherein:
   the discharge-region determining unit is configured to determine a target of the combination in a case where the printing rate detected at the region not requiring the toner discharge exceeds a threshold value for combination; and
   the region combining unit is configured to combine a plurality of regions that are targets of the combination in a case where the plurality of regions are adjacent to one another.

8. The image forming apparatus according to claim 1, further comprising a region resetting unit configured to reset a redivision of the region in a case where a tendency of the printing rate has changed after the redivision of the region.

9. The image forming apparatus according to claim 2, further comprising a region resetting unit configured to reset a redivision of the region in a case where a tendency of the printing rate has changed after the redivision of the region.

10. The image forming apparatus according to claim 3, further comprising a region resetting unit configured to reset a redivision of the region in a case where a tendency of the printing rate has changed after the redivision of the region.

11. The image forming apparatus according to claim 4, further comprising a region resetting unit configured to reset redivision or combination of the regions in a case where a tendency of the printing rate has changed after redivision or combination of the regions.

12. The image forming apparatus according to claim 7, further comprising a region resetting unit configured to reset redivision or combination of the regions in a case where a tendency of the printing rate has changed after redivision or combination of the regions.

13. The image forming apparatus according to claim 8, wherein the region resetting unit is configured to perform the reset of redivision or combination of the regions in a case where a change amount of an average printing rate for all the regions exceeds an allowable change width.

14. The image forming apparatus according to claim 13, wherein the region resetting unit is configured to perform the reset in a case where a change amount of at least any one of the regions changes to exceed an allowable change width in units of region even if the change amount of the average printing rate is within a range of the allowable change width.

15. A non-transitory computer-readable recording medium storing a program for a refresh process for an image forming apparatus that includes an image carrier and a toner carrier configured to carry toner and supply the toner to the image carrier so as to form a toner image, the program causing a computer to function as:
  a region setting unit configured to set a plurality of regions divided along an image width direction on the image carrier;
  a printing-rate detecting unit configured to detect a printing rate for each of the plurality of regions;
  a discharge-region determining unit configured to determine necessity of a toner discharge for each region based on the detected printing rate; and
  a region redividing unit configured to redivide a region determined to require the toner discharge into a plurality of regions in which respective printing rates during subsequent image formation are individually detected, wherein
  the toner discharge is a refresh process that discharges toner from the toner carrier side to the image carrier side while not forming an image.

16. The non-transitory computer-readable recording medium according to claim 15, wherein:
  the program causing a computer to further function as a discharge performing unit configured to perform the toner discharge on the region determined to require the toner discharge; and
  the region redividing unit is configured to redivide a region on which the toner discharge has been performed.

17. An image forming method using an image forming apparatus that includes an image carrier and a toner carrier configured to carry toner and supply the toner to the image carrier so as to form a toner image, the method comprising:
  setting a plurality of regions divided along an image width direction on the image carrier;
  detecting a printing rate for each of the plurality of regions;
  determining necessity of a toner discharge for each region based on the detected printing rate; and
  redividing a region determined to require the toner discharge into a plurality of regions in which respective printing rates during subsequent image formation are individually detected; wherein
  the toner discharge is a refresh process that discharges toner from the toner carrier side to the image carrier side while not forming an image.

18. The method according to claim 17, further comprising performing the toner discharge on the region determined to require the toner discharge; wherein the redividing includes redividing a region on which the toner discharge has been performed.

* * * * *